United States Patent [19]

Daniell et al.

[11] Patent Number: 5,405,901
[45] Date of Patent: Apr. 11, 1995

[54] PROCESS OF PRODUCING ETHYLENE POLYMER BLENDS IN GAS PHASE

[75] Inventors: Paul T. Daniell, Tornado; Michael W. Tilston, Dunbar; Thomas E. Spriggs, Cross Lanes, all of W. Va.; Burkhard E. Wagner, Highland Park; Arakalgud V. Ramamurthy, East Windsor, both of N.J.

[73] Assignee: Union Carbide Chemicals & Plastics Technology Corporation, Danbury, Conn.

[21] Appl. No.: 271,023

[22] Filed: Jul. 6, 1994

[51] Int. Cl.[6] .............................................. C08L 23/08
[52] U.S. Cl. ...................................... 525/53; 525/247; 525/248; 525/268; 525/320; 525/322; 525/324; 526/65; 526/66
[58] Field of Search ................. 525/53, 247, 248, 268, 525/320, 322, 324; 526/65, 66, 79, 82, 86, 88

[56] References Cited

U.S. PATENT DOCUMENTS

| | | | |
|---|---|---|---|
| 4,370,456 | 1/1983 | George | 526/125 |
| 4,684,703 | 8/1987 | Wagner et al. | 526/88 |
| 4,874,820 | 10/1989 | Cozewith et al. | 525/240 |
| 5,047,468 | 9/1991 | Lee et al. | 525/53 |
| 5,126,398 | 6/1992 | Lee et al. | 525/53 |

FOREIGN PATENT DOCUMENTS 533452  3/1993  European Pat. Off. .

Primary Examiner—Romulo H. Delmendo
Attorney, Agent, or Firm—Saul R. Bresch

[57] ABSTRACT

A gas phase process for the production of a polyethylene blend comprising contacting ethylene and at least one alpha-olefin comonomer having 3 to 8 carbon atoms with a magnesium/titanium based catalyst system including an activator and a cocatalyst in each of two fluidized bed reactors connected in series, under polymerization conditions, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (e), no additional catalyst is introduced into the second reactor;

(c) in the first reactor in which a low melt index copolymer is made:
  (1) the alpha-olefin is present in a ratio of about 0.01 to about 0.4 mole of alpha-olefin per mole of ethylene;
  (2) optionally, hydrogen is present in a ratio of about 0.001 to about 0.3 moles of hydrogen per mole of ethylene; and
  (3) the ethylene partial pressure is at least about 40 pounds per square inch; and (d) in the second reactor in which a high melt index copolymer is made:
  (1) the alpha-olefin is present in a ratio of about 0.01 to about 0.6 mole of alpha-olefin per mole of ethylene;
  (2) hydrogen is present in a ratio of about 1 to about 2.5 moles of hydrogen per mole of ethylene; and
  (3) diethyl zinc is added in an amount of about 2 to about 40 moles of diethyl zinc per mole of titanium; and (e) additional hydrocarbyl aluminum cocatalyst is introduced into the second reactor in an amount sufficient to restore the level of activity of the catalyst transferred from the first reactor to about the initial level of activity in the first reactor.

6 Claims, No Drawings

PROCESS OF PRODUCING ETHYLENE POLYMER BLENDS IN GAS PHASE

TECHNICAL FIELD

This invention relates to a process for preparing an in situ polyethylene blend, which can be converted into film having a small number or essentially no gels (or fish-eyes).

BACKGROUND INFORMATION

There has been a rapid growth in the market for linear low density polyethylene (LLDPE), particularly resin made under mild operating conditions; typically at pressures of 100 to 300 psi and reaction temperatures of less than 100° C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. Although the majority of the LLDPE resins on the market today have a narrow molecular weight distribution, LLDPE resins with a broad molecular weight distribution are available for a number of non-film applications.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

The blending of these polymers is successfully achieved in a staged reactor process similar to those described in U.S. Pat. Nos. 5,047,468 and 5,149,738. Briefly, the process is one for the in situ blending of polymers wherein a higher density ethylene copolymer is prepared in a high melt index reactor and a lower density ethylene copolymer is prepared in a low melt index reactor. The process typically comprises continuously contacting, under polymerization conditions, a mixture of ethylene and one or more alpha-olefins with a catalyst system in two gas phase, fluidized bed reactors connected in series, said catalyst system comprising: (i) a supported magnesium/titanium based catalyst precursor; (ii) an aluminum containing activator compound; and (iii) a hydrocarbyl aluminum cocatalyst, the polymerization conditions being such that an ethylene copolymer having a melt index in the range of about 0.1 to about 1000 grams per 10 minutes is formed in the high melt index reactor and an ethylene copolymer having a melt index in the range of about 0.001 to about 1 gram per 10 minutes is formed in the low melt index reactor, each copolymer having a density of about 0.860 to about 0.965 gram per cubic centimeter and a melt flow ratio in the range of about 22 to about 70, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (e), no additional catalyst is introduced into the second reactor;

(c) in the high melt index reactor:
  (1) the alpha-olefin is present in a ratio of about 0.02 to about 3.5 moles of alpha-olefin per mole of ethylene; and
  (2) hydrogen is present in a ratio of about 0.05 to about 3 moles of hydrogen per mole of combined ethylene and alphaolefin;

(d) in the low melt index reactor:
  (1) the alpha-olefin is present in a ratio of about 0.02 to about 3.5 moles of alpha-olefin per mole of ethylene; and
  (2) hydrogen is, optionally, present in a ratio of about 0.0001 to about 0.5 mole of hydrogen per mole of combined ethylene and alpha-olefin; and (e) additional hydrocarbyl aluminum cocatalyst is introduced into the second reactor in an amount sufficient to restore the level of activity of the catalyst transferred from the first reactor to about the initial level of activity in the first reactor.

While the in situ blends prepared as above and the films produced therefrom are found to have the advantageous characteristics heretofore mentioned, the commercial application of these granular bimodal polymers for high clarity film applications is frequently limited by the level of gels obtained. Particle size distribution and flow characteristics studies indicate that the gas phase resins having an average particle size (APS) of about 400 to about 600 microns exhibit significant compositional, molecular, and rheological heterogeneities. When such a granular resin is compounded, for example, with a conventional twin screw mixer in a single pass, and the resulting pellets are fabricated into film, the film exhibits a high level of gels ranging in size from less than about 100 microns to greater than about 500 microns. These gels adversely effect the aesthetic appearance of the product. The gel characteristics of a film product are usually designated by a subjective scale of Film Appearance Rating (FAR) varying from minus 50 (very poor; these films have a large number of large gels) to plus 50/plus 60 (very good; these films have a small amount of, or essentially no, gels). The FAR of the single pass film product mentioned above is generally in the range of about minus 50 to about minus 10/0. For commercial acceptability, the FAR should be plus 20 or better.

Disclosure of the Invention

An object of this invention, therefore, is to provide a process for preparing an in situ blend, which, can be extruded into a film having a commercially acceptable FAR. Other objects and advantages will become apparent hereinafter.

According to the present invention such a process has been discovered. The process comprises contacting ethylene and at least one alpha-olefin comohomer having 3 to 8 carbon atoms with a magnesium/titanium based catalyst system including an activator and a cocatalyst in each of two fluidized bed reactors connected in series, in the gas phase, under polymerization conditions, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (e), no additional catalyst is introduced into the second reactor;

(c) in the first reactor in which a low melt index copolymer is made:
   (1) the alpha-olefin is present in a ratio of about 0.01 to about 0.4 mole of alpha-olefin per mole of ethylene;
   (2) hydrogen is present in a ratio of about 0.001 to about 0.3 mole of hydrogen per mole of ethylene; and
   (3) the ethylene partial pressure is at least about 40 pounds per square inch; and (d) in the second reactor in which a high melt index copolymer is made:
   (1) the alpha-olefin is present in a ratio of about 0.005 to about 0.6 mole of alpha-olefin per mole of ethylene;
   (2) hydrogen is, optionally, present in a ratio of about 1 to about 3 moles of hydrogen per mole of ethylene; and
   (3) diethyl zinc is added in an amount of about 2 to about 40 moles of diethyl zinc per mole of titanium; and (e) additional hydrocarbyl aluminum cocatalyst is introduced into the second reactor in an amount sufficient to restore the level of activity of the catalyst transferred from the first reactor to about the initial level of activity in the first reactor.

In a preferred embodiment, the polymer formed in the first reactor has a flow index in the range of about 0.01 to about 30 grams per 10 minutes and a density in the range of about 0.860 to about 0.940 gram per cubic centimeter and the polymer formed in the second reactor has a melt index in the range of about 50 to about 3000 grams per 10 minutes and a density in the range of about 0.900 to about 0.975 gram per cubic centimeter, the weight ratio of first reactor polymer to second reactor polymer being in the range of about 0.67:1 to about 2:1.

Description of the Preferred Embodiment(s)

As noted, the blend is produced in two staged reactors connected in series wherein a mixture of resin and catalyst precursor is transferred from the first reactor to the second reactor in which another copolymer is prepared and blends in situ with the copolymer from the first reactor.

The copolymers produced in each of the reactors are copolymers of ethylene and at least one alpha-olefin comonomer having 3 to 8 carbon atoms, preferably one or two alpha-olefin comohomers. The alpha-olefins can be, for example, propylene, 1-buterie, 1-hexene, 4-methyl-1-pentene, and 1-octene.

Preferred comohomer combinations

| first reactor | second reactor |
|---|---|
| 1-hexene | 1-hexene |
| 1-butene | 1-hexene |
| 1-butene | 1-butene |
| 1-hexene | 1-butene |

The 1-hexene/1-hexene combination is found to give the best film properties; however, the 1-hexene/1-butene combination is found to provide acceptable properties while still meeting FDA specifications since a terpolymer increases the FDA allowable comonomer content, e.g., for a 1-hexene copolymer, the maximum allowable comonomer content is 10 percent by weight whereas for a 1-hexene/1-butene terpolymer, the maximum allowable comonomer content is 15 percent by weight. For FDA purposes, the 1-hexene/1-hexene combination is considered a copolymer and the 1-hexene/1-butene combination is considered a terpolymer.

It will be understood that the in situ blend can be characterized as a bimodal resin. The properties of bimodal resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements. In the process of this invention, it is unexpectedly found that increasing the ethylene partial pressure together with the addition of diethyl zinc to the second reactor produces a blend, which extrudes into a film having a high FAR and exceptional high speed extrusion bubble stability.

High speed extrusion bubble stability is an important factor in blown film extrusion processes. A blown film extrusion process is one in which molten polymer is forced through an annular die to form a continuous cylindrical tube. Outside the die, the tube is blown out to a larger diameter than the die diameter, cooled by an air ring, and then flattened before wind-up. The ratio of the final diameter of the cylindrical tube to the diameter of the annulus is called the blow-up ratio (BUR). The combination of the extrusion rate, BUR, and the speed with which the tube is drawn out determines the final film thickness. The ability to produce thinner films at higher rates of extrusion is governed by many factors including the molecular and rheological characteristics of the molten polymer, dependence of properties on temperature, and the design of the air ring.

The entire cylindrical tube between the die and the collapsing frame (where the tube is flattened) is called the "bubble." This is a cylindrical bubble in contrast to traditionally familiar spherical bubbles in which air, or some other gas, is enveloped by a thin liquid film. Here, air is used to blow a thin molten polymer film. Although the cross-section (circular) of the bubble does not change, the bubble looks conical from the outside because of a change in the diameter until the solidification at the frost-line height (FLH). Sometimes, e.g., with high density polyethylene, the bubble looks like a cylindrical semi-molten tube with a diameter approximately equal to the ring diameter before being blown out into a larger diameter. Past the FLH, however, the shape does not change from a circular cylindrical tube of constant diameter. Note that between the die and the FLH the bubble is always semi-molten.

One would like to produce a final film with close tolerance in film thickness under stable conditions of operation. That is, the shape of the bubble remains the same without any change over time. The highest extrusion rate and the highest wind-up speed that can be used without changing the shape of the bubble provides the operating constraints for a given resin in a given system (extruder, air ring, cooling air temperature, etc.). For example, at a given extrusion rate, if one can increase the wind-up speed to make thinner film without losing the shape of the bubble, then the resin is said to have good high speed extrusion bubble stability.

Often, the bubble stability within a given extrusion system is directly related to the molecular characteristics which influence the behavior of the bubble. For example, it is easier to stretch chewing gum into a very thin thread without breakage than a rubber band. A rubber band stiffens as it is stretched and, beyond a certain point, it will break. However, the stiffening of the rubber band also gives it better stability since it will be less sensitive to external disturbances. This is not the case with the chewing gum since it deforms very easily and is very sensitive to disturbances. In the blown film concept, one would like to have rubber band behavior as the bubble is being blown and stretched rather than a chewing gum behavior. In this invention, the addition of diethyl zinc in the second reactor has been found to provide better high speed extrusion bubble stability, i.e., the film can be drawn at higher wind-up speeds to produce thinner films than without the use of diethyl zinc.

The magnesium/titanium based catalyst system can be exemplified by the catalyst system described in U.S. Pat. No. 4,302,565. The precursor can be supported or unsupported. Another catalyst system is one where the precursor is formed by spray drying and used in slurry form. Such a catalyst precursor, for example, contains titanium, magnesium, and aluminum halides, and an electron donor, and is attached to the surface of silica. The precursor is then introduced into a hydrocarbon medium such as mineral oil to provide the slurry form. This is described in U.S. Pat. No. 5,290,745.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound is optional, but is often used with any of the titanium based catalyst precursors. The activator can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and $a+b+c=3$. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. If it is desired to use an activator, about 0.10 to about 10 moles, and preferably about 0.15 to about 2.5 moles, of activator can be used per mole of electron donor. The molar ratio of activator to titanium can be in the range of about 1:1 to about 10:1 and is preferably in the range of about 2:1 to about 5:1.

The cocatalyst, generally a hydrocarbyl aluminum cocatalyst, can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum dihydride, di-isobutyl-hexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:
(a) a catalyst precursor having the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;
(b) at least one modifier having the formula $BX_3$ or $AlR_{(3-e)}X_e$ wherein each R is alkyl or aryl and is the same or different, and X and e are as defined above for component (a)
wherein components (a) and (b) are impregnated into an inorganic support; and
(c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)$ $Cl_3$, $Ti(OCOCH_3)$ $Cl_3$, and $Ti(OCOC_6H_5)$ $Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

The entire catalyst system, which includes the precursor or activated precursor and the cocatalyst, is added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is, preferably, conducted in the gas phase using a continuous fluidized process. A typical fluidized bed reactor is described in U.S. Pat. No. 4,482,687.

A relatively low melt index (or high molecular weight) copolymer is prepared in the first reactor. The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer medium. Alternatively, the low molecular weight copolymer is prepared in the first reactor and the high molecular weight copolymer is prepared in the second reactor.

In the high molecular weight reactor:
Because of the low values, instead of melt index, flow index is determined and those values are used in this specification. The flow index can be in the range of about 0.01 to about 30 grams per 10 minutes, and is preferably in the range of about 0.2 to about 12 grams per 10 minutes. The molecular weight of this polymer is, generally, in the range of about 135,000 to about 445,000. The density of the copolymer can be at least 0.860 gram per cubic centimeter, and is preferably in the range of 0.900 to 0.940 gram per cubic centimeter. The melt flow ratio of the polymer can be in the range of about 20 to about 70, and is preferably about 22 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

In the low molecular weight reactor:
A relatively high melt index (or low molecular weight) copolymer is prepared in this reactor. The high melt index can be in the range of about 50 to about 3000 grams per 10 minutes, and is preferably in the range of about 50 to about 1000 grams per 10 minutes. The molecular weight of the high melt index copolymer is, generally, in the range of about 15,800 to about 35,000. The density of the copolymer prepared in this reactor can be at least 0.900 gram per cubic centimeter, and is preferably in the range of 0.910 to 0.975 gram per cubic centimeter. The melt flow ratio of this copolymer can be in the range of about 20 to about 70, and is preferably about 20 to about 45.

The blend or final product, as removed from the second reactor, can have a melt index in the range of about 0.02 to about 3.5 grams per 10 minutes, and preferably has a melt index in the range of about 0.04 to about 2.0 grams per 10 minutes. The melt flow ratio is in the range of about 55 to about 135, and is preferably in the range of about 55 to about 125. The molecular weight of the final product is, generally, in the range of about 90,000 to about 450,000. The density of the blend is at least 0.915 gram per cubic centimeter, and is preferably in the range of 0.916 to 0.960 gram per cubic centimeter.

The blend has a broad molecular weight distribution which can be characterized as bimodal. The broad molecular weight distribution is reflected in an Mw/Mn ratio of about 10 to about 40, preferably about 20 to about 30. Mw is the weight average molecular weight; Mn is the number average molecular weight; and the Mw/Mn ratio can be referred to as the polydispersity index, which is a measure of the breadth of the molecular weight distribution.

The weight ratio of copolymer prepared in the high molecular weight reactor to copolymer prepared in the low molecular weight reactor can be in the range of about 0.67:1 to about 2:1, and is preferably in the range of about 0.75:1 to about 1.6:1. The optimum weight ratio is about 1:1. This is also known as the split.

The magnesium/titanium based catalyst system, ethylene, alpha-olefin, and hydrogen are continuously fed into the first reactor; the polymer/catalyst mixture is continuously transferred from the first reactor to the second reactor; ethylene, alpha-olefin, and hydrogen, as well as cocatalyst are continuously fed to the second reactor. The final product is continuously removed from the second reactor.

In the low melt index, as reflected in flow index, reactor, i.e., the first reactor:

The mole ratio of alpha-olefin to ethylene can be in the range of about 0.01:1 to about 0.4:1, and is preferably in the range of about 0.02:1 to about 0.26:1. The mole ratio of hydrogen (if used) to ethylene can be in the range of about 0.001:1 to about 0.3:1, and is preferably in the range of about 0.017:1 to about 0.18:1. The operating temperature is generally in the range of about 60° C. to about 100° C. Preferred operating temperatures vary depending on the density desired, i.e., lower temperatures for lower densities and higher temperatures for higher densities.

In the high melt index reactor, i.e., the second reactor:

The mole ratio of alpha-olefin to ethylene can be in the range of about 0.005:1 to about 0.6:1, and is preferably in the range of about 0.01:1 to about 0.42:1. The mole ratio of hydrogen to ethylene can be in the range of about 1.0:1 to about 3:1, and is preferably in the range of about 1.7:1 to about 2.2:1. The operating temperature is generally in the range of about 70° C. to about 110° C. As mentioned above, the temperature is preferably varied with the desired density.

The pressure is generally the same in both the first and second reactors. The pressure, i.e., the total pressure in the reactor, can be in the range of about 200 to about 450 psi and is preferably in the range of about 280 to about 350 psig. The ethylene partial pressure in the first reactor is at least about 40 psi and is preferably at least about 45 psi. The upper limit of ethylene partial pressure in the first reactor and the ethylene partial pressure in the second reactor are set according to the amount of copolymer it is desired to produce in each of these reactors, i.e., to achieve the split mentioned above. It is noted that increasing the ethylene partial pressure in the first reactor leads to an increase in ethylene partial pressure in the second reactor. Generally, the ethylene partial pressure roughly doubles in the second reactor over the first reactor. The balance of the total pressure is provided by alpha-olefin other than ethylene and an inert gas such as nitrogen.

As noted, diethyl zinc is added to the second reactor in an amount of about 2 to about 40 moles of diethyl zinc per mole of titanium, and preferably about 6 to about 10 moles of diethyl zinc per mole of titanium. The amount of titanium is based on the total amount of titanium used in the catalyst system.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is described in U.S. Pat. No. 4,482,687.

The gaseous feed streams of ethylene, other gaseous alphaolefins, and hydrogen, when used, are preferably fed to the reactor recycle line as well as liquid alpha-olefins and the cocatalyst solution. Optionally, the liquid cocatalyst can be fed directly to the fluidized bed. The partially activated or completely activated catalyst precursor is preferably injected into the fluidized bed as a solid or a mineral oil slurry. In the case of partial activation, activator is added to the reactor. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate.

The hydrogen:ethylene molar ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

Several steps can be taken, in addition to temperature control, to prevent agglomeration. The product discharge line between the reactor and the product pot is often plugged up with chunks between intervals of product drops. A continuous purge flow of nitrogen or reactor gas in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, avoidance of quick change of gas composition, selective use of static-neutralizing chemicals and surface passivation with aluminum alkyls.

It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This passivation is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to reduce the level of static.

The residence time of the mixture of reactants including gaseous and liquid reactants, catalyst, and resin in each fluidized bed can be in the range of about 1 to about 12 hours and is preferably in the range of about 2 to about 5 hours.

The resin blend can be extruded into film in a conventional extruder adapted for that purpose. Extruders and processes for extrusion are described in U.S. Pat. Nos. 4,814,135; 4,857,600; 5,076,988; and 5,153,382. Examples of various extruders, which can be used in forming the film are a single screw type such as one modified with a blown film die and air ring and continuous take off equipment, a blown film extruder, and a slot cast extruder. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160° to about 270 degrees C., and is preferably carried out at temperatures in the range of about 180° to about 240 degrees C.

The advantages of the invention are found in the film prepared from the resin blend in that FAR values of plus 20 or higher are consistently achieved as well as high speed extrusion bubble stability. Thus, the blend can be extruded to thinner gauges at higher extrusion speeds, and the resulting film has essentially no or few gels.

In order to maintain a constant production rate, the increased ethylene partial pressure is accompanied with a decrease in the amount of catalyst fed. Consequently, catalyst productivity is increased, an additional advantage of the process.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Patents mentioned in this specification are incorporated by reference herein.

The invention is illustrated by the following example.

EXAMPLE

The catalyst precursor is formed by spray drying and is used in slurry form. It contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745 (' 745). The catalyst precursor and method of preparing same used in this example is the same composition and preparation method as example 1 of ' 745 filed except that diethylaluminum chloride and tri-n-hexylaluminum are not used.

Ethylene is copolymerized with 1-hexene in each of two fluidized bed reactors in two runs. The conditions are the same in each run except that the ethylene partial pressure is higher in the second run, and diethyl zinc (DEZ) is added to the second reactor in the second run. The total pressure in each reactor is 300 psia. Each polymerization is continuously conducted after equilibrium is reached under conditions set forth in the Table.

Polymerization is initiated in the first reactor by continuously feeding the above catalyst precursor and cocatalyst triethylaluminum (TEAL) into a fluidized bed of polyethylene granules together with ethylene, 1-hexene, and hydrogen. The TEAL is first dissolved in isopentane (5 percent by weight TEAL). The resulting copolymer mixed with active catalyst is withdrawn from the first reactor and transferred to the second reactor using nitrogen as a transfer medium. The second reactor also contains a fluidized bed of polyethylene granules. Again, ethylene, 1-hexene, and hydrogen are introduced into the second reactor where the gases come into contact with the copolymer and catalyst from the first reactor. Additional cocatalyst is also introduced. Diethyl zinc (DEZ) is introduced into the second reactor in the second run in a molar ratio of DEZ to titanium of 8.4:1. The product blend is continuously removed.

In addition to variable polymerization conditions, resin properties, film extrusion conditions, and film properties are given in the following Table.

TABLE

| | first reactor | second reactor | final product |
|---|---|---|---|
| reaction conditions | | | |
| temperature (°C.) | 85 | 110 | — |
| comonomer | 1-hexene | 1-hexene | — |
| C2 partial pressure (psia) in first run | 30 | 72 | — |
| C2 partial pressure (psia) in second run | 47.5 | 102 | — |
| H2/C2 molar ratio | 0.028 | 1.8 | — |
| comonomer/C2 | 0.034 | 0.015 | — |

TABLE-continued

| | first reactor | second reactor | final product |
|---|---|---|---|
| molar ratio | | | |
| catalyst feeder (rpm) | 8000 | — | — |
| precursor feed (lbs/hr) first run | 0.029 | — | — |
| precursor feed (lbs/hr) second run | 0.014 | — | — |
| TEAL feed rate (cc/hr) | 250 | 170 | — |
| resin properties | | | |
| DEZ feed rate (lb/hr) first run | — | none | — |
| DEZ feed rate (lb/hr) second run | — | 0.0033 | — |
| production rate (lbs/hr) | 30 | 20 | — |
| bed weight (lbs) | 85 | 120 | — |
| residence time (hrs) | 2.83 | 2.4 | — |
| flow index (g/10 min) | 0.45 | 28000 | 8 |
| melt index (g/10 min) | 0.16 | 1000 | 0.065 |
| density (g/cc) | 0.930 | 0.968 | 0.948 |
| melt flow ratio | 28 | 28 | 123 |
| residual titanium (ppm) | 5 | — | 3 |
| bulk density (lbs/cu ft) | 24 | — | 28 |
| average particle size (inch) | 0.022 | — | 0.022 |
| split ratio (wt %) | 0.6 | 0.4 | — |
| resin properties film extrusion conditions | | | |
| melt temperature (°C.) | — | — | 204 |
| die rate (lbs/hr/in) | — | — | 8.4 |
| throughput rate (lbs/hr) first run | — | — | 107 |
| throughput rate (lbs/hr) second run | — | — | 101 |
| frostline height (inches) | — | — | 38 |
| blow up ratio | — | — | 4:1 |
| gauge (mil) | — | — | 0.5 |
| gel count(no. of gels per cm²) first run | — | — | 1.8 |
| gel count(no. of gels per cm²) second run | — | — | 0.05 |
| key film properties: | | | |
| FAR first run | — | — | minus 30 |
| FAR second run | plus 30 | — | plus 20 to |
| bubble stability first run | — | — | poor |
| bubble stability second run | — | — | good |

Notes to above Table:
1. Resin properties for second reactor: these are theoretical values based on the assumption that the second reactor copolymer is produced independently.
2. The films are extruded in a 50 millimeter Alpine ™ film extruder having an 80 millimeter die and a 1.0 millimeter die gap.
3. Density is measured by producing a plaque in accordance with ASTM D-1928, procedure C, and then testing as is via ASTM D-1505. The density is reported in gram per cubic centimeter.
4. Melt Index (g/10 min) is determined under ASTM D-1238, Condition E. It is measured at 190° C. and reported as grams per 10 minutes.
5. Flow Index is determined under ASTM D-1238, Condition F. It is measured at 10 times the weight used in the melt index test above.
6. Melt flow ratio is the ratio of flow index to melt index.
7. The bulk density of each of the resins (not the blend) is given in pounds per cubic foot.
8. Split ratio (wt %): This is the percent by weight of each polyethylene in the blend based on the weight of the blend.
9. The molecular weight distribution is performed via Size Exclusion Chromatography using a Waters ™ 150C with trichlorobenzene as solvent at 140 degrees C. with a broad molecular weight distribution standard and broad molecular weight distribution calibration method.
10. Die rate is defined as pounds per hour per inch of die circumference.
11. Frostline height is that distance off of the base of the die during which the polymer undergoes a phase transformation from a viscous liquid to a solid.
12. Blow up ratio is the ratio of the bubble diameter to the die diameter.
13. Gel count is the average of two counts, and includes both large and small gels. temperature of 200° C. 100 successive gels in each film are identified, and the size and distribution of the gels are determined via video microscopy. The frequency of gels of a given size ( either by the diameter or area of the gel) is plotted against the size of the gel.
The number of large (greater than 75 microns) gels and the number of small (less than 75 microns) gels are counted over a film area of 150 square centimeters. Two replicate measurements are made and averaged.
14. FAR is the film appearance rating, a rating derived by visual inspection of the film discussed above.
15. Bubble stability is explained above.

We claim:
1. A gas phase process for the production of a polyethylene blend comprising contacting ethylene and at least one alpha-olefin comonomer having 3 to 8 carbon atoms with a magnesium/titanium based catalyst system including an activator and a cocatalyst in each of two fluidized bed reactors connected in series, under polymerization conditions, with the provisos that:
   (a) the mixture of ethylene copolymer matrix and active catalyst formed in the first reactor in the series is transferred to the second reactor in the series;
   (b) other than the active catalyst referred to in proviso (a) and the cocatalyst referred to in proviso (e), no additional catalyst is introduced into the second reactor;
   (c) in the first reactor in which a low melt index copolymer is made:
      (1) the alpha-olefin is present in a ratio of about 0.01 to about 0.4 mole of alpha-olefin per mole of ethylene;
      (2) optionally, hydrogen is present in a ratio of about 0.001 to about 0.3 mole of hydrogen per mole of ethylene; and
      (3) the ethylene partial pressure is at least about 40 pounds per square inch; and
   (d) in the second reactor in which a high melt index copolymer is made:
      (1) the alpha-olefin is present in a ratio of about 0.005 to about 0.6 mole of alpha-olefin per mole of ethylene;
      (2) hydrogen is present in a ratio of about 1 to about 3 moles of hydrogen per mole of ethylene; and
      (3) diethyl zinc is added in an amount of about 2 to about 40 moles of diethyl zinc per mole of titanium; and

(e) additional hydrocarbyl aluminum cocatalyst is introduced into the second reactor in an amount sufficient to restore the level of activity of the catalyst transferred from the first reactor to about the initial level of activity in the first reactor.

2. The process defined in claim 1 wherein the polymer formed in the first reactor has a flow index in the range of about 0.01 to about 30 grams per 10 minutes and a density in the range of about 0.860 to about 0.940 gram per cubic centimeter and the polymer formed in the second reactor has a melt index in the range of about 50 to about 3000 grams per 10 minutes and a density in the range of about 0.900 to about 0.975 gram per cubic centimeter, the weight ratio of first reactor polymer to second reactor polymer being in the range of about 0.67:1 to about 2:1.

3. The process defined in claim 2 wherein the blend has a melt index in the range of about 0.02 to about 3.5 grams per 10 minutes; a melt flow ratio in the range of about 55 to about 135; and a density in the range of 0.915 to 0.960 gram per cubic centimeter.

4. The process defined in claim 3 wherein the blend is produced under the following conditions:
in the first reactor:
   (1) the alpha-olefin is 1-hexene and is present in a ratio of about 0.02 to about 0.26 mole of alpha-olefin per mole of ethylene;
   (2) hydrogen is present in a ratio of about 0.017 to about 0.18 mole of hydrogen per mole of ethylene; and
   (3) the ethylene partial pressure is at least about 45 pounds per square inch; and
(d) in the second reactor:
   (1) the alpha-olefin is 1-hexene or 1-butene and is present in a ratio of about 0.01 to about 0.42 mole of alpha-olefin per mole of ethylene;
   (2) hydrogen is present in a ratio of about 1.7 to about 2.2 moles of hydrogen per mole of ethylene; and
   (3) diethyl zinc is added in an amount of about 6 to about 10 moles of diethyl zinc per mole of titanium.

5. The process defined in claim 4 wherein the blend has a melt index in the range of about 0.04 to about 2.0 grams per 10 minutes; a melt flow ratio in the range of about 55 to about 125; and a density in the range of 0.916 to 0.960 gram per cubic centimeter.

6. A gas phase process for the production of a polyethylene blend wherein the polymer formed in the first reactor is a copolymer of ethylene, 1-hexene, and, optionally, one or more other up to 8 carbon atom alpha-olefins having a flow index in the range of about 0.2 to about 12 grams per 10 minutes and a density in the range of about 0.900 to about 0.940 gram per cubic centimeter and the polymer formed in the second reactor is a copolymer of ethylene, 1-butene or 1-hexene, and, optionally, one or more other up to 8 carbon atom alpha-olefins having a melt index in the range of about 50 to about 1000 grams per 10 minutes and a density in the range of about 0.910 to about 0.975 gram per cubic centimeter, the weight ratio of first reactor polymer to second reactor polymer being in the range of about 0.75:1 to about 1.6:1, comprising contacting ethylene and the aforementioned alpha-olefins with a magnesium/titanium based catalyst system including an activator and a cocatalyst in each of two fluidized bed reactors connected in series, under polymerization conditions, with the provisos that:
(a) the mixture of ethylene copolymer matrix and active catalyst formed in the first reactor in the series is transferred to the second reactor in the series;
(b) other than the active catalyst referred to in proviso (a) and the cocatalyst referred to in proviso (e), no additional catalyst is introduced into the second reactor;
(c) in the first reactor:
   (1) the alpha-olefin is present in a ratio of about 0.02 to about 0.26 mole of alpha-olefin per mole of ethylene;
   (2) hydrogen is present in a ratio of about 0.017 to about 0.18 mole of hydrogen per mole of ethylene; and
   (3) the ethylene partial pressure is at least about 45 pounds per square inch; and
(d) in the second reactor:
   (1) the alpha-olefin is present in a ratio of about 0.01 to about 0.42 mole of alpha-olefin per mole of ethylene;
   (2) hydrogen is present in a ratio of about 1.7 to about 2.2 moles of hydrogen per mole of ethylene; and
   (3) diethyl zinc is added in an amount of about 6 to about 10 moles of diethyl zinc per mole of titanium; and
(e) additional hydrocarbyl aluminum cocatalyst is introduced into the second reactor in an amount sufficient to restore the level of activity of the catalyst transferred from the first reactor to about the initial level of activity in the first reactor.

* * * * *